US011300933B2

(12) United States Patent
Funderburk (10) Patent No.: US 11,300,933 B2
(45) Date of Patent: Apr. 12, 2022

(54) SYSTEM AND METHOD FOR AUTOMATED WATER PRESSURE AND FLOW MONITORING

(71) Applicant: 541 Water Inc., Central Point, OR (US)

(72) Inventor: David E. Funderburk, Central Point, OR (US)

(73) Assignee: 541 Water Inc., Central Point, OR (US)

( * ) Notice: Subject to any disclaimer, the term of this patent is extended or adjusted under 35 U.S.C. 154(b) by 0 days.

(21) Appl. No.: 16/551,425

(22) Filed: Aug. 26, 2019

(65) Prior Publication Data
US 2020/0064794 A1  Feb. 27, 2020

Related U.S. Application Data
(60) Provisional application No. 62/723,432, filed on Aug. 27, 2018.

(51) Int. Cl.
*G05B 15/02* (2006.01)
*G06Q 50/06* (2012.01)
*F04D 13/08* (2006.01)

(52) U.S. Cl.
CPC ........... *G05B 15/02* (2013.01); *F04D 13/086* (2013.01); *G06Q 50/06* (2013.01)

(58) Field of Classification Search
CPC ..... G05B 15/02; F04D 13/086; F04D 27/001; G06Q 50/06
See application file for complete search history.

(56) References Cited

U.S. PATENT DOCUMENTS

| | | | |
|---|---|---|---|
| 7,330,796 B2* | 2/2008 | Addink | E03B 7/071 |
| | | | 702/45 |
| 8,346,492 B2* | 1/2013 | Yang | G01M 3/243 |
| | | | 702/48 |
| 10,330,560 B2* | 6/2019 | Yung | G01M 3/28 |

(Continued)

FOREIGN PATENT DOCUMENTS

CN   104846934 A   8/2015

OTHER PUBLICATIONS

International Search Report and Written Opinion of the International Searching Authority directed to related International Patent Application No. PCT/US2019/048188, dated Nov. 19, 2019; 13 pages.

(Continued)

*Primary Examiner* — Charles R Kasenge
(74) *Attorney, Agent, or Firm* — Jerry Haynes Law (57) ABSTRACT

Described herein is automated water pressure monitoring system. The system monitors the water use within a pressurized water system. A pressured water system may include a water line receiving water from a water source such as a well. The system includes a sensor, control module, and data repository. The sensor is mounted along a water line configured to detect pressure generated by a water pressurization system within the water line. The sensor continuously provides data regarding the pressure generated by the water within the water line. The control module is operatively coupled to the sensor and continuously receives data from the sensor. The control module is configured to detect variances over time in the pressure generated by the water.

20 Claims, 6 Drawing Sheets

(56) References Cited

U.S. PATENT DOCUMENTS

| | | |
|---|---|---|
| 2002/0124633 A1 | 9/2002 | Yang et al. |
| 2006/0009928 A1* | 1/2006 | Addink ............... G01M 3/2815 702/50 |
| 2008/0109175 A1* | 5/2008 | Michalak ............... C02F 1/008 702/50 |
| 2008/0251131 A1 | 10/2008 | Ford |
| 2011/0093220 A1* | 4/2011 | Yang ....................... G01M 3/36 702/51 |
| 2011/0290965 A1* | 12/2011 | Virgin ................... G06F 1/1632 248/205.3 |
| 2014/0019498 A1 | 1/2014 | Cidon et al. |
| 2016/0349140 A1 | 12/2016 | Teymouri |
| 2017/0131174 A1 | 5/2017 | Enev et al. |
| 2018/0067011 A1* | 3/2018 | Yung ..................... G01M 3/28 |
| 2018/0127957 A1* | 5/2018 | Enev .................. G01M 3/2815 |
| 2018/0230681 A1* | 8/2018 | Poojary ............... G01M 3/2815 |
| 2018/0238765 A1* | 8/2018 | Gramespacher .... G01M 3/2815 |
| 2018/0291911 A1* | 10/2018 | Ward ................. F04D 15/0218 |
| 2019/0323919 A1* | 10/2019 | Fung-A Wing ......... G01M 3/40 |

OTHER PUBLICATIONS

Mounce et al., "Development and verification of an online artificial intelligence system for detection of bursts and other abnormal flows," *Journal of Water Resources Planning and Management*, vol. 136, No. 3, pp. 309-318, May 15, 2009.

\* cited by examiner

SYSTEM AND METHOD FOR AUTOMATED WATER PRESSURE AND FLOW MONITORING

CROSS REFERENCE TO RELATED APPLICATIONS

This application claims priority to U.S. Provisional Application No. 62/723,432, filed on Aug. 27, 2018, the contents of which are incorporated by reference herein in their entirety.

BACKGROUND

There are over 15 million private water systems in the United States, mostly groundwater wells. Every well has a well pump, pressure tank, and several other critical components that all have to function effectively to supply water to a home. If any of these components fail, the well pump may get damaged. Furthermore, since private well owners do not receive a monthly water bill, they are usually oblivious to their water usage and are unaware if there is a leak until the well pump or well fails from over use. The average cost to replace a well pump is $5000.00.

Conventionally, well pump protection devices use a method that monitors the pump's electrical current load as amperage and will shut the pump off when the load is higher or lower than its normal running load. These devices do not determine the causes of problems that a well pump may experience. These devices provide no or limited data as to what caused the problem and when and why it occurred.

Furthermore, conventional water metering methods do not monitor the entire water system as they are installed after the well system components. For example, if a leak on the well pipe or pressure tank exists, a typical water meter installation will not detect the leak. Conventional devices may protect the pump, but they do not determine the cause of the problem. Furthermore, conventional devices provide no or limited data as to what caused the problem, and when and why it occurred.

Other types of water monitoring systems incorporate smart water meters can meter water and indicate whether there is a leak or high water use. Some are equipped with an auto shut off to protect the home from leaks. While these meters are useful, they do not monitor the entire water system, as they are installed after the well system components. For example, such systems will not detect a leak on the well pipe or detect a bad pressure tank. Additionally, many pump protectors do not trip off the pump when there are leaks or short cycles from a bad pressure tank unless the pump actually gets hot (overloaded or underloaded). In this case water and power are wasted, and wear on the pump and other components occur.

BRIEF DESCRIPTION OF THE FIGURES

The accompanying drawings, which are incorporated herein and form part of the specification, illustrate the present disclosure and, together with the description, further serve to explain the principles of the disclosure and enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Described herein is an automated water pressure monitoring system. The system monitors water use within a pressurized water system. A pressurized water system may include a water line receiving water from a water source such as a well. The system includes a sensor, control module, and data repository. The sensor is mounted along a water line configured to detect pressure generated by the water within the water line. The sensor continuously provides data regarding the pressure generated by the water within the water line. The control module is operatively coupled to the sensor and continuously receives data from the sensor. The control module is configured to detect variances over time in the pressure system generated by the pressurized water. This provides early detection of a well problem and a tool to provide valuable data to diagnose and remedy the cause.

The control module can identify an abnormal event in the water line causing the variances, by matching the detected variances to a unique signature tied to the abnormal event. The abnormal event may include but is not limited to leaks, rapid pump cycling, failing components, mechanical or electrical design, and/or installation conflicts common to domestic, commercial, industrial, agricultural, and municipal water systems, and/or the like. By monitoring the pressure patterns and identifying which patterns are normal the system is able to detect abnormal patterns and thus trigger an alert. When the system is calibrated to the individual water system, any pressure patterns outside can be characterized as one or more types of alerts. The control module may provide real-time or near real-time alerts indicating the abnormal event, to end user devices operated by users such as a home owner or a water professional.

The system provides early detection of a problem and data to diagnose and resolve the problem. In this regard, the system solves the technical problem of protecting the water pump and also identifying the event that caused the problem based on the collected data.

Figure 1:
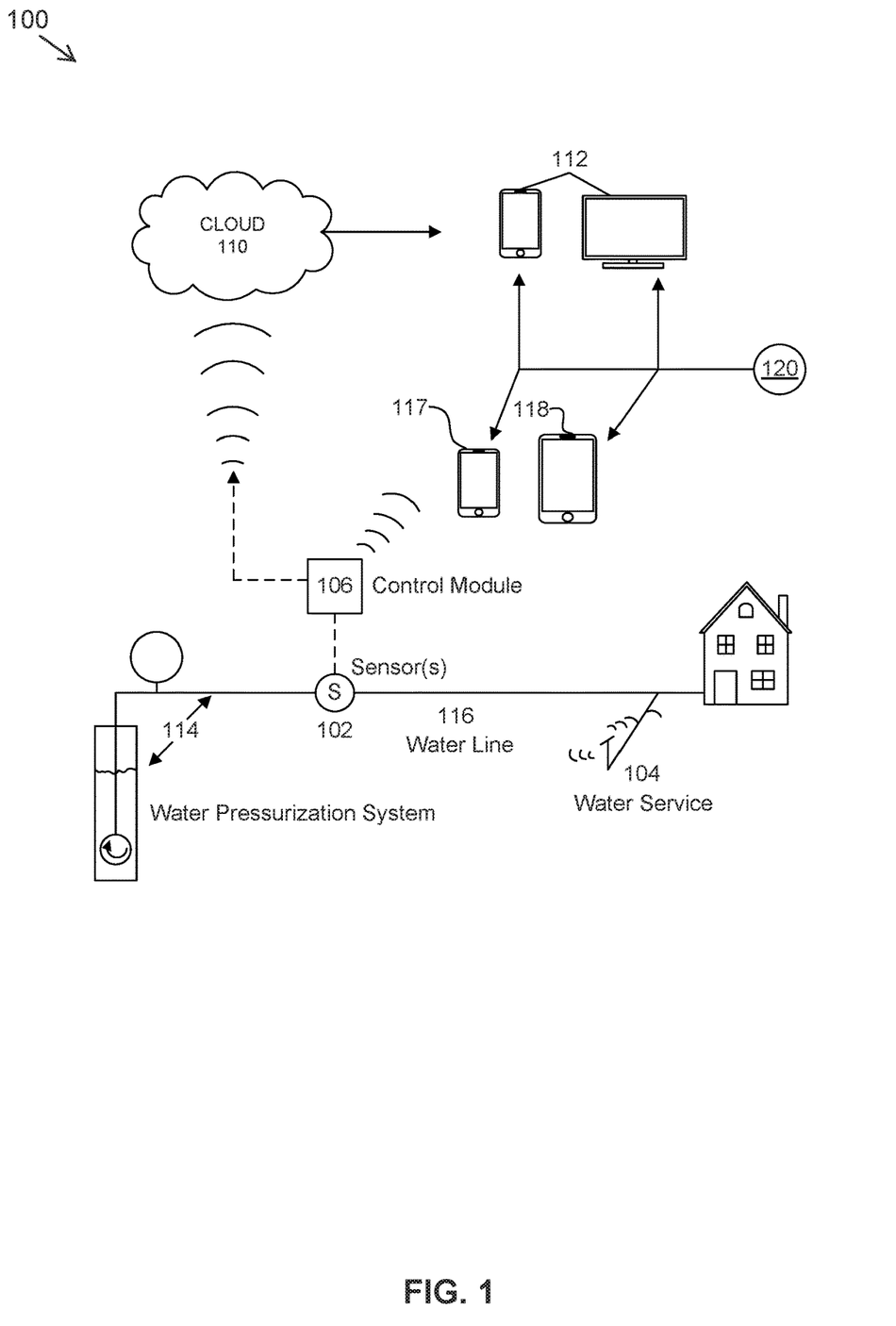
FIG. 1 illustrates a diagram of an exemplary automated water pressure monitoring system, in accordance with an embodiment.

FIG. 1 illustrates a diagram of an exemplary automated water pressure monitoring system 100, in accordance with an embodiment. The automated water pressure monitoring system 100 may include water pressurization system 114. The water pressurization system 114 may include a water fluid line 116 coupled to a water source such as a well. The water fluid line 116 may receive and transport water from the well to a location such as a water service 104 of a house or building. The automated water pressure monitoring system 100 may further include a sensor 102 and a control module 106.

The sensor 102 may be mounted on or inside the water fluid line 116. The control module 106 may be disposed above ground and may be operatively connected to the sensor 102 via an electronic cable. In an embodiment, the control module 106 may be mounted to a wall of the house or building.

In an embodiment, the control module 106 provides an electrical current through the sensor 102 to form a pressure signal and is in continuous or periodic connection with the sensor 102. The sensor 102 may be a pressure sensor configured to detect pressure generated by a water pressurization system 114 in the water line 116. The sensor 102 may be but is not limited to: an electronic pulse sensor, an analog electric signal sensor, a digital electric signal sensor, an ultrasonic sensor, and a magnetic sensor. The selection of the sensor 102 is based on the field conditions and compatibility of sensor 102 with environmental and water pressurization system 114 methods and water line 116 type and size per application. The sensor 102 may measure pressure in pounds per square inch of fluid pressure within the water line 116, or any other national or international unit of measurement known to a person of skill in the art.

The sensor 102 may continuously or periodically monitor the pressure of the water within the water line 116 and/or in the water pressurization system 114. The sensor 102 may generate an electrical signal as a function of the detected pressure of water within the water line 116 and/or in the water pressurization system 114. The sensor 102 may transmit the electrical signal to the control module 106. The electrical signal may be encoded with the data indicating measurements of the pressure of the water in the water line 116.

The control module 106 may continuously receive electrical signals encoded with data indicating measurements of the pressure of the water in the water line 116 and/or in the water pressurization system 114, from the sensor 102. The control module 106 may extract the data from the encoded electrical signals for processing and storage.

The control module 106 may be calibrated with a parameter set specific to water pressurization system 114 to which the sensor 102 is mounted. A calibrated parameter set defines normal operating conditions such as pumping time cycles, water demand periods, and periods of no water use in the pressurized water system. For example, the water pressurization system 114 may provide water to a residential house. The control module 106 may identify a cycle of water pressure variations water when the residents of the house are taking showers as normal patterns of water pressure for that water pressurization system 114.

The calibration process records a first normal draw down (depressurization of pressure tank) and tank refill (re-pressurization of pressure tank). This corresponds to the time it takes to substantially empty a stored, fully pressurized state of the pressure tank and refill the tank to full pressure. The control module 106 may be pre-programmed with the pressure swing and time duration. This is known to the control module 106 as "PUMP CYCLE".

The next calibration is to form a baseline of the high and low pressure cycle intervals and the duration and time of each cycle. This is called a normal flow event, or "NORM FLOW EVENT" to control module 106. There are many normal flow events pre-programmed into the control module 106. For example, a bath routine has a flow event that will be recognized by pressure down & up cycles for a duration of typically 30-60 minutes that repeats daily, twice daily or even every other day. The time of day and repetition are indicative that it is a bath routine. After the routine, the water pressure should stabilize and remain stable until the next flow event. The next flow event may be a hand washing or other minimal water use flow events. After these minimal flow events, the pressure should again remain stable. The control module 106 may look for regular repeating patterns over the calibration period. If the pressure is not completely stable for long periods of time, there is most likely an abnormal event such as a water leak that will need resolved before calibration is successful. After the calibration is successful the system will detect flow events out outside the normal flow events.

The control module 106 may store and identify water pressure patterns which are normal for the water pressurization system 114 based on the received encoded electric signals, using the calibrated parameter set. The control module 106 may store the decoded pressure and time data received from the sensor 102 in, for example, flash memory storage device. The control module 106 may identify variances over time based on the encoded electrical signals received from the sensor 102. The control module 106 may identify variances in the water pressure that do not match the normal patterns of water pressure of the water pressurization system 114. The control module 106 may identify abnormal events which may cause these variances by matching a signature of the abnormal event and the detected variances.

The signature may include specified patterns of water pressure over time. The abnormal events may be but are not limited to leaks, rapid pump cycling, failing components, mechanical or electrical design, and/or installation conflicts common to domestic, commercial, industrial, agricultural and municipal water systems, and/or the like. Each of these abnormal events may be associated with a unique signature.

As non-limiting example, Table 1 lists example abnormal events and their signatures:

TABLE 1

Abnormal Events and Signatures

| Abnormal Event | Signature |
| --- | --- |
| RAPID PUMP CYCLE | A continuous pressure down and up cycle that corresponds to a cycle time that is of less duration than the calibrated Pump Cycle time regardless of other flow events. |
| SMALL LEAK | A repetitive Pump Cycle Event that is repetitive on regular interval in periods of no flow events. The closer together in time that the Norm Flow Event occurs, the larger the leak. |
| BROKEN PIPE/ LARGE LEAK | When the Norm Flow Event does not reach its high pressure or end of Pump Cycle event, this is an indication of a large leak or broken pipe. This could also be a water hose left open or a turned on sprinkler. |
| WEAK PUMP/LOW STATIC | When the Norm Flow Event takes a longer percentage of time to reach its high pressure set point repeatedly after flow events. This indicates the pump has lost its pumping capacity or the water static level in the well has dropped. |
| HIGH PRESS | When the Norm Flow Event pressure exceeds the calibrated high pressure point it indicates the pump turn off control is not operating correctly. |

TABLE 1-continued

Abnormal Events and Signatures

| Abnormal Event | Signature |
| --- | --- |
| WATER HAMMER | When sudden high pressure events are recorded it indicates a device within the plumbing or water treatment system is closing the water flow too fast and can cause damage to water system components. |
| HIGH PSID | A second sensor, installed after water filtration or conditioning equipment, is configured to detect excessive pressure differential (PSID) from the treatment device. When the pressure detected by the sensor before the water treatment is greater than the pressure detected by the second sensor after the water treatment for a continued (specified) time period it indicates a plugged filter or other obstruction in the treatment system. |

Accordingly, the pressure event condition monitoring and notification includes at least one, but is not limited to, the following monitoring and alerting capabilities: excessive pump running, excessive pump cycles, low static water levels, restriction of flow, excessive water consumption, plumbing leaks, appliance consumption and pressurized water system component failures. Additionally, as would be evident to a person of ordinary skill in the art, other types of flow conditions can indicate abnormal flow and/or pressure events which could cause specific problems related to the individual water system. In an embodiment, the water professional may add custom alerts based on the individual water system characteristics. It is also noteworthy that there are some pressurization systems which do not incorporate a pressure variable to control the Pump Cycle. Such a type of system is an ON/OFF system, such as used for irrigation, water transfer pumps, dewater pumps, and more. The system can be programmed specifically to monitor and trigger specific pressure parameters in these applications related to normal and abnormal conditions. As a result, leaks, restrictions and equipment failures can be remedied before excessive water system wear and damage occur. Such early detection may save water, energy, and pump system replacement costs.

The control module 106 may include a display. The control module 106 may render the current pressure condition on the display. In response to detecting and identifying an abnormal event, the control module 106 may render an alert on the display. Furthermore, in response to detecting and identifying an abnormal event, the control module 106 may generate an audible alarm. The alert may also be generated when the current pressure recording deviates from the calibrated pressure parameters for a defined time period or repeated cycle events.

In an embodiment, the control module 106 may be in communication with water professional devices 112 or 118 or home owner devices 117. Each of water professional devices 112, 118 and home owner devices 117 may be, for example and without limitation, a phone, a tablet, a laptop, a computer, and processing software. The water professional devices 112 or 118 or home owner (or user) devices 117 may execute an application 120 to interface with the control module 106. The control module 106 may transmit alerts to the water professional devices 112, 118 or home owner devices 117. The water professional devices 112, 118 or home owner devices 117 may receive and render the alerts, via the application. The water professional devices 112, 118 or home owner devices 117 and application 120 will be described in greater detail with respect to FIGS. 3 and 4.

The control module 106 may also be in communication with a data repository configured to store water pressure data of a specific water pressurization system 114. The control module 106 may transmit the water pressure data received from the sensor 102 to the data repository for storage. The control module 106 may transmit the water pressure data to the data repository after a given period of time or continuously. The data repository may reside in a cloud computing environment 110. The cloud computing environment will be described in greater detail with respect to FIG. 4.

In an embodiment, the sensor 102 may additionally or alternatively be embodied as a flow sensor. For example, the sensor 102 may incorporate a measurement of flow by means of electronic pressure or flow measurement sensors, or a plurality of such sensors. The flow sensor may be configured to measure flow rates of the water in the water pressurization system 114. The control module 102 may be able to determine abnormal events based on the data received from the flow sensor using the same process as described above.

Figure 2:
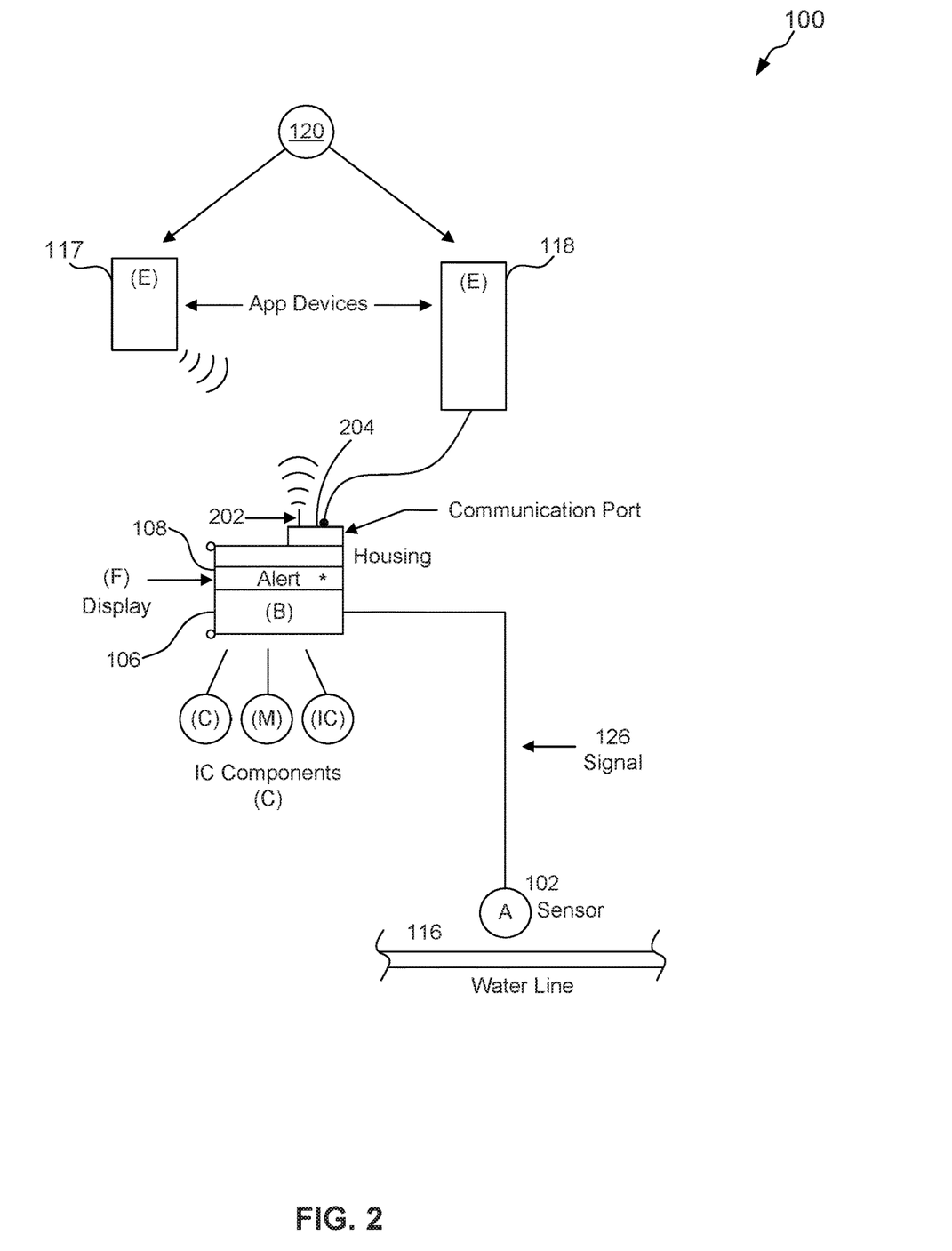
FIG. 2 illustrates a diagram of an embodiment of an automated water pressure monitoring system, including a user control module and a water professional control module, in accordance with an embodiment.

FIG. 2 illustrates a diagram of an embodiment of the automated water pressure and monitoring system 100, including a user device 117 and a water professional device 118, in accordance with an embodiment. As described above, user device 117 and water professional device 118 may execute application 120. The user device 117 may be operated by a home owner, while the water professional device 118 may be operated by a water professional configured to provide maintenance to the water pressurization system. Both the user device 117 and the water professional device 118 may interface with the control module 106 using the application 120.

Application 120 may provide different interfaces to the user device 117 and the water professional device 118. As the user device 117 is operated by a home owner, the information provided to the user device 117, via the application 120, may be limited and simplified. The information provided to the water professional device 118 may be more detailed and technical. The different interfaces may be rendered on the respective devices based on authentication details provided at the execution of the application 120.

The control module 106 may include a plastic housing, an integrated circuit, a display 108, and a communications port including a wireless communications interface 202 and/or a wired communications interface 204. As a non-limiting example, the plastic housing encases control module 106, which allows for facilitated mounting near the water line 116 and the sensor 102. The control module 106 may communicate with the user device 117 or the water professional device 118 using the wireless communications interface 202 and/or the wired communications interface 204.

While the sensor 102 is referred to throughout this application using the example of a pressure sensor sensing the pressure of the fluid flowing through the water line 116, one of skill in the art will recognize that there are other pressure and flow sensing methods that may be incorporated to accomplish the result of accurately detecting pressure and flow, without departing from the spirit and scope of the present disclosure. For example, the sensor 102 may additionally or alternatively be a flow sensor sensing the flow rate of the fluid flowing through the water line 116. In an embodiment wherein the sensor 102 is a pressure sensor, the sensor 102 may be a sensor or plurality of sensors generating an electrical signal 126 as a function of the pressure imposed through the water line 116. The electrical signal 126 may be encoded with the detected pressure measurements. In an embodiment, the electrical signal 126 is continuously transmitted to the control module 106, although periodic transmissions are also contemplated. The control module 106 may receive the electrical signal and may extract the pressure measurement data from the electrical signal. The control module 106 may determine whether the pressure measurements indicate a normal flow status or an abnormal event.

The pressure variation under normal conditions is relatively stable. These normal conditions are defined and are field adjustable by the water professional using the historical water pressure data. For example, a water professional may adjust the parameters for a normal flow event using the application 120 executing on the water professional device 118 or 112. The application 120 may allow the water professional device to download the data files, which may be displayed as trend charts in graphic format, to reveal normal water use, pump cycling, continuous leaks, irrigation cycles and pumping times. In this manner, leaks or equipment defects within the water pressurization system and other water system components, including water purification and conditioning equipment, can be remedied before excessive component wear and damage occur.

In response to detecting an abnormal event, the control module 106 may transmit an alert to the user device 117 or water professional device 118. The application 120 executing on the user device 117 or water professional device 118 may render the alert on the display of the user device 117 or water professional device 118. The control module 106 may also include a display 108. The control module 106 may also render the alert on the display 108.

Figure 3:
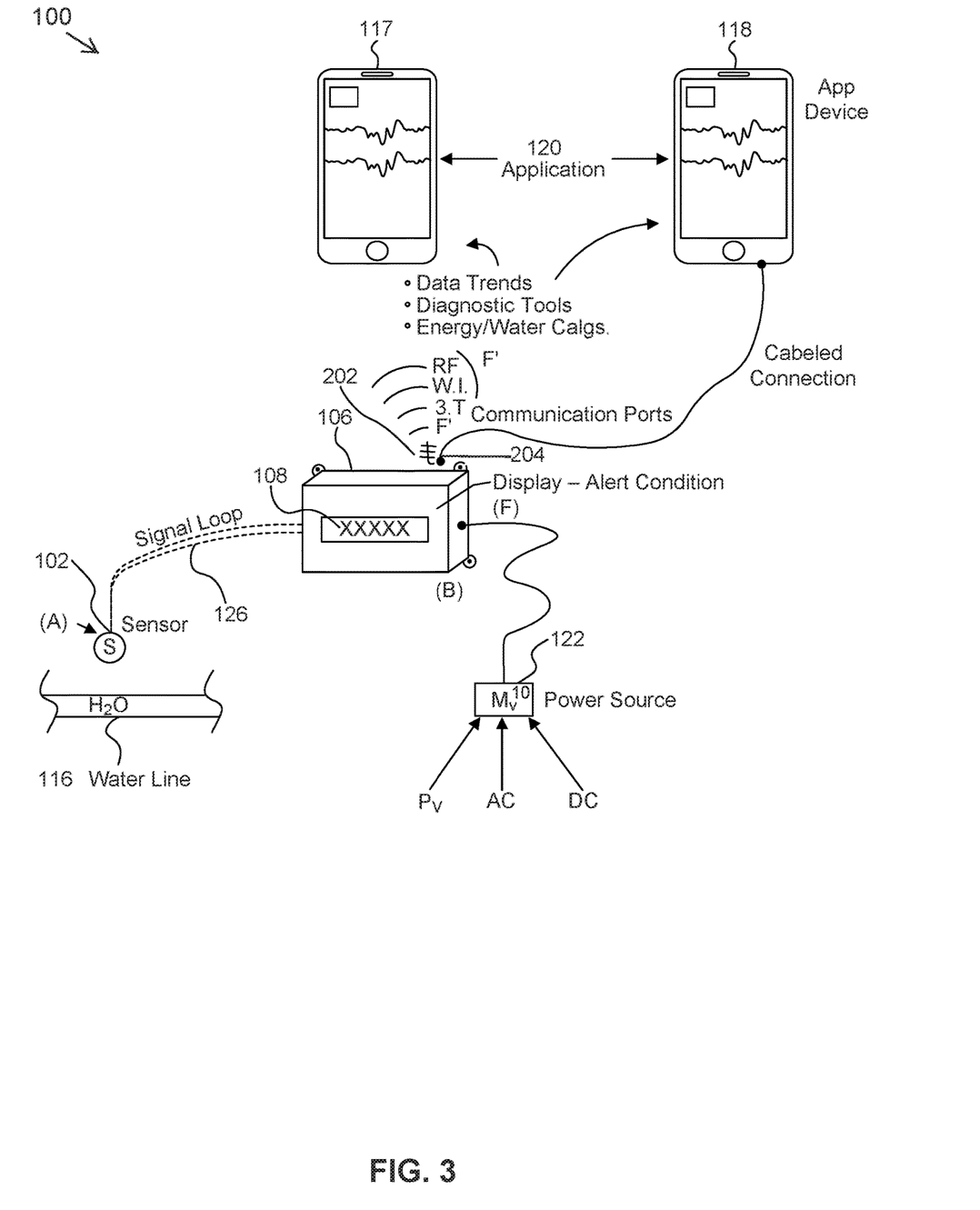
FIG. 3 illustrates a diagram of a third embodiment of an automated water pressure sensing and monitoring system, including connectivity of the data acquisition and transmission of data, in accordance with an embodiment.

FIG. 3 illustrates a diagram of the automated water pressure and monitoring system 100, including connectivity of the data acquisition and transmission of data, in accordance with an embodiment. The control module 106 may include a power source 122, such as a battery or connection to an existing power supply. The power source may be, for example, a mV/10 power supply. The control module 106 may act as a power source for the sensor. The control module 106 may be coupled to sensor 102 using a cord. The sensor 102 may transmit an electronic signal 126 encoded with pressure measurement data to the control module 106, while control module 106 may transmit power to the sensor 102. In this regard, the control module 106 may form a signal loop with the sensor 102 to analyze the fluid pressure signal therefrom. This signal loop allows the pressure reading to be transmitted and analyzed for storage and transmission by the control module 106.

The user device 117 and water professional device 118 may execute application 120 to interface with the control module 106. The control module 106 may use wireless communication interface 202 to wirelessly transfer data to the user device 117 and water professional device 118. Alternately, the data transfer can be accomplished by means of a data transmission cable using the wired communication interface 204 to any compatible device executing application 120 including the user device 117 and water professional device 118.

The control module 106 can analyze the pressure data from the sensor 102 to identify leaks in a pressurized water line 116. For example, based on the analysis of the pressure data, the control module 106 may identify an occurrence of a leak and/or a type of abnormal pattern that has occurred. The pressure data can be analyzed in the frequency domain, in the time domain, or in both the frequency and time domains to identify different types of leaks and abnormal pressure conditions and patterns.

In some embodiments, the control module 106 monitors fluid pressure electronically. The electric signal is interpreted by integrated circuits, and data logged and processed. This provides useful pressure data that reveals fluid conditions both normal and abnormal which indicate various fluid failures, such as leaks, rapid pump cycling and failing components common to domestic, commercial, industrial, agricultural, and municipal water systems that utilize pumping systems. The pressure alert event is based on an analysis of data acquisition and processing within the control module 106 and algorithms identifying a deviation from the predefined or determined pressure parameter through the water line 116 of the water pressurization system.

The control module 106 can communicate with the user devices 117 and water professional device 118. In this manner, the control module 106 can be used for detecting leaks of pressurized systems on a continuous monitoring basis with the use of the user device 117 and water professional device 118. In this manner, any variations to pressure are detected and alerted to the user remotely and in real time or near real-time. Alternatively the control module 106 can monitor at set, periodic intervals. A display 108 and alarm on the control module 106 may allow user to see the identified type of deficiency without the user device 117 and water professional device 118.

In some embodiments, the water professional who installs the system 100 can also monitor the fluid pressure. The water professional utilizes a water professional device 118 (smartphone, tablet) executing the application 120, that incorporates additional features that enables the transfer of data files, which may be displayed on the water professional device 118 as, for example, trend charts in graphic format, to reveal normal water use, pump cycling, continuous leaks, irrigation cycles, and pumping times. The water professional device 118 may interface with the data repository in the cloud computing environment.

Figure 4:
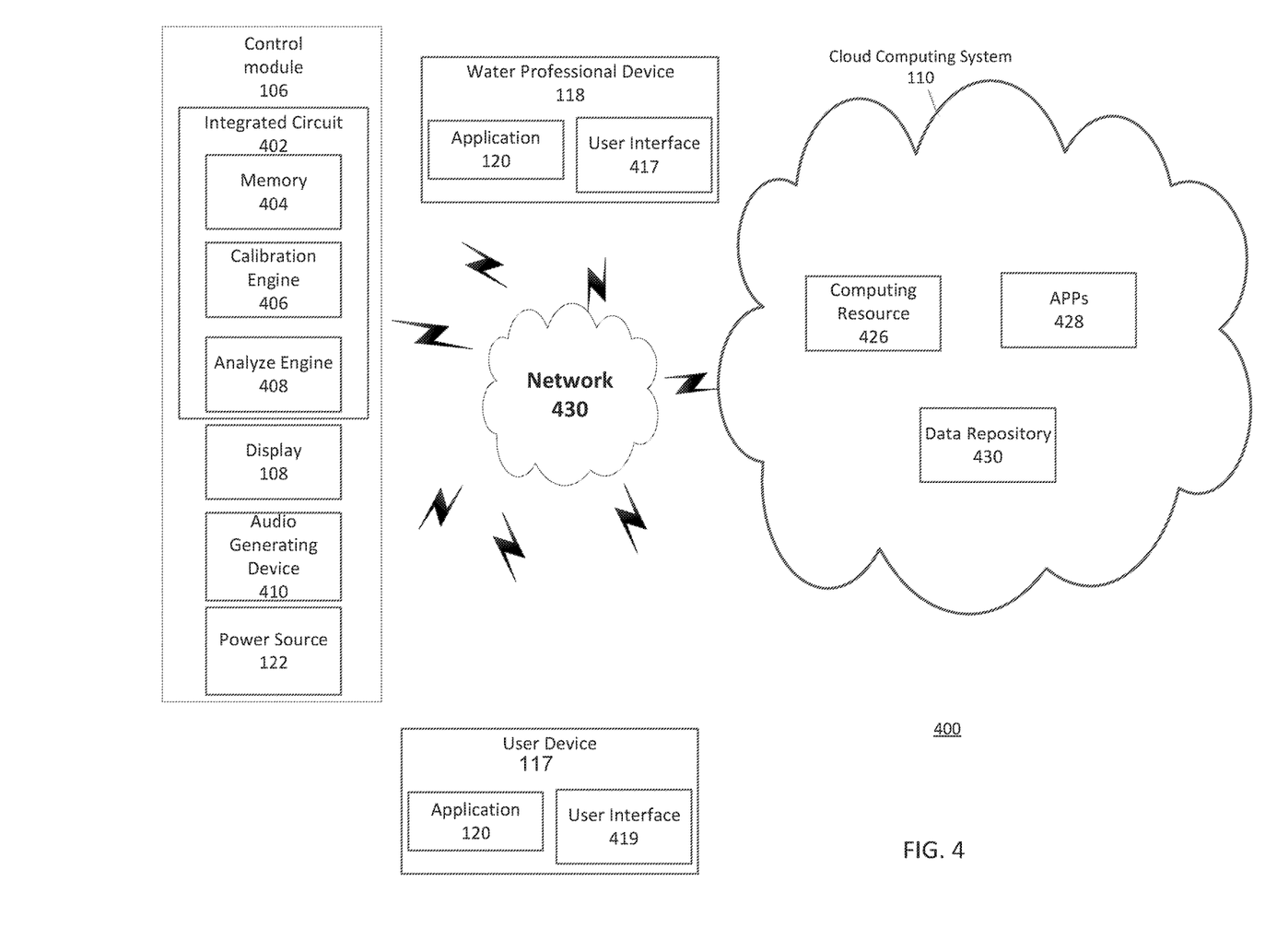
FIG. 4 illustrates an example environment in which systems and/or methods for automated water pressure monitoring according to an embodiment.

FIG. 4 illustrates an example environment in which systems and/or methods for water pressure analysis and defect notification are implemented according to some embodiments. The environment 400 may include a control module 106, a user device 117, and a water professional device 118. Control module 106 may include an integrated circuit 402. The integrated circuit may include a memory 404, calibration engine 406, and analyze engine 408. The user device 117 may include an application 120 and user interface 419. The water professional device 118 may include application 120 and user interface 417. It can be appreciated the application 120 may be the same application for user device 117 and water professional device 118. Alternatively, the application 120 may be a different application for user device 117 and water professional device 118. For example, when implemented on user device 117, the application 120 may simply provide the owner with a notification that the water pressurization system 114 or fluid line 116 has deficiencies and requires professional service, while the more detailed data and estimated cause of error may be accessed by water professional device 118.

The devices of the environment 400 may be connected through wired connections, wireless connections, or a combination of wired and wireless connections. In an example embodiment, one or more portions of the network 430 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Cloud computing environment 110 may include an environment that delivers computing as a service, shared resources, services, etc. . . . . Cloud computing environment 110 may provide computation, software, data access, storage, and/or other services that do not require end-user knowledge of a physical location and configuration of a system and/or a device that delivers the services. Cloud computing system 110 may include computer resources 426, applications 428, and data repository 430.

The computing resource 426 may include one or more personal computers, workstations, computers, server devices, or other types of computation and/or communication devices. The computing resource 426 may communicate with other cloud computing resources via wired connections, wireless connections, or a combination of wired or wireless connections.

Computing resources 426 may include a group of cloud resources, such as one or more virtual machines ("VMs"), virtualized storage ("VS"), and one or more hypervisors ("HYPs").

Applications 428 may include one or more software applications that may be provided to or accessed by user device 117 or water professional device 118. In an embodiment, applications 428 may execute locally on user device 117 or water professional device 118. Alternatively, the applications 428 may eliminate a need to install and execute software applications on or by user device 117 or water professional device 118. The applications 428 may include software associated with any other software configured to be provided across the cloud computing environment 110. The application 428 may send/receive information from one or more other applications 428, via the virtual machine.

In one embodiment, the calibration engine 406 of the control module 106 may be calibrated to a specific water line. In this regard, the calibration engine 406 may be programmed to identify the pressure swing and time duration ("PUMP CYCLE") and a baseline of the high and low pressure cycle intervals and the duration and time of each cycle ("NORM FLOW EVENT") for the specified water line. In this manner, the calibration engine 404 may identify water pressure patterns that are expected for the specified water line. The "NORM FLOW EVENT" may indicate the expected water pressure patterns in the water pressurization system.

The control module 106 may be operatively coupled to a sensor configured to detect and measure pressure data in a water line. The control module may continuously receive electronic signals from a sensor coupled to a water line. The electronic signals may be encoded with pressure measurement data from the water in the water line. The analyze engine 408 may extract the pressure measurement data from the electronic signal. The analyze engine 408 may store the pressure measurement data in the memory 404. The memory 404 may store water pressure data for a specified period of time (e.g., 30 days). The analyze engine 408 may process and store water pressure data over time. The analyze engine 408 may identify water pressure patterns based on the received pressure measurement data and previously received pressure measurement data stored in memory 404. Based on the identified water pressure patterns, the analyze engine 408 may determine whether the water pressure is within the NORM FLOW EVENT of the water line or rather an abnormal event.

The analyze engine 408 may identify an abnormal event based on a unique signature associated with the abnormal event. For example, based on received pressure measurement data and previously received pressure measurement data stored in memory 404, analyze engine 408 may identify that the water pressure is exceeding a high pressure point that is higher than the calibrated high pressure point. The analyze engine 408 may identify that pattern to correspond with a unique signature of a "HIGH PRESS" event, which is an abnormal event.

In an embodiment, the analyze engine 408 may also interface with the data repository 430 stored in the cloud computing environment 110 to store the received water pressure data in the data repository 430. The analyze engine 408 may also retrieve data from the data repository 430 to identify water pressure patterns.

In response to detecting an abnormal event, the control module 106 may render an alert message on the display 108. Alternatively or additionally, the control module 106 may transmit an audible alarm through the audio generating device 410. Furthermore, the control module 106 may transmit the alert message to the user device 117 or water professional device 118. The alert message may indicate the details of the abnormal event, including the name of the event, time of the event, severity of the event, and/or the like.

The application 120 executing on the user device 117 or water professional device 118 may receive the alert. The application 120 may render the alert message on the user interface 419 for user device 117 and user interface 417 for water professional device 118.

The user devices 117 may be operated by home or building owners monitoring the water lines of the home or building. The water professional device 118 may be operated by a water professional monitoring the water lines of the home or building. The user device 117 and/or water professional device 118 may interface with the control module 106 using the application 120. Upon execution of the application 120 the application may prompt the end user (home owner or water professional) to enter authentication details. Based on the authentication details, the application 120 may generate a different interface for the end user. For example, the water professional using the water professional device 118 may have access to the data repository 430 in the cloud computing environment 110 through the application 120, while the home owner using the user device 117 may not have access to the data repository 430.

The application 120 may allow the water professional device 118 to download the data files, which may be displayed as trend charts in graphic format, to reveal normal water use, pump cycling, continuous leaks, irrigation cycles and pumping times. The application 120 may allow the home owners to view the water usage patterns based on the water pressure patterns over time.

In an embodiment, the automated pressure monitoring system may also be embodied as an automated flow monitoring system to detect abnormal events in a water pressurization system. In such an embodiment, the sensor may be embodied as a flow sensor. The flow sensor may be configured to measure flow rates of the water in the water pressurization system. The control module 106 may be able to determine abnormal events based on the data received from flow sensor using the same process as described above.

Figure 5:
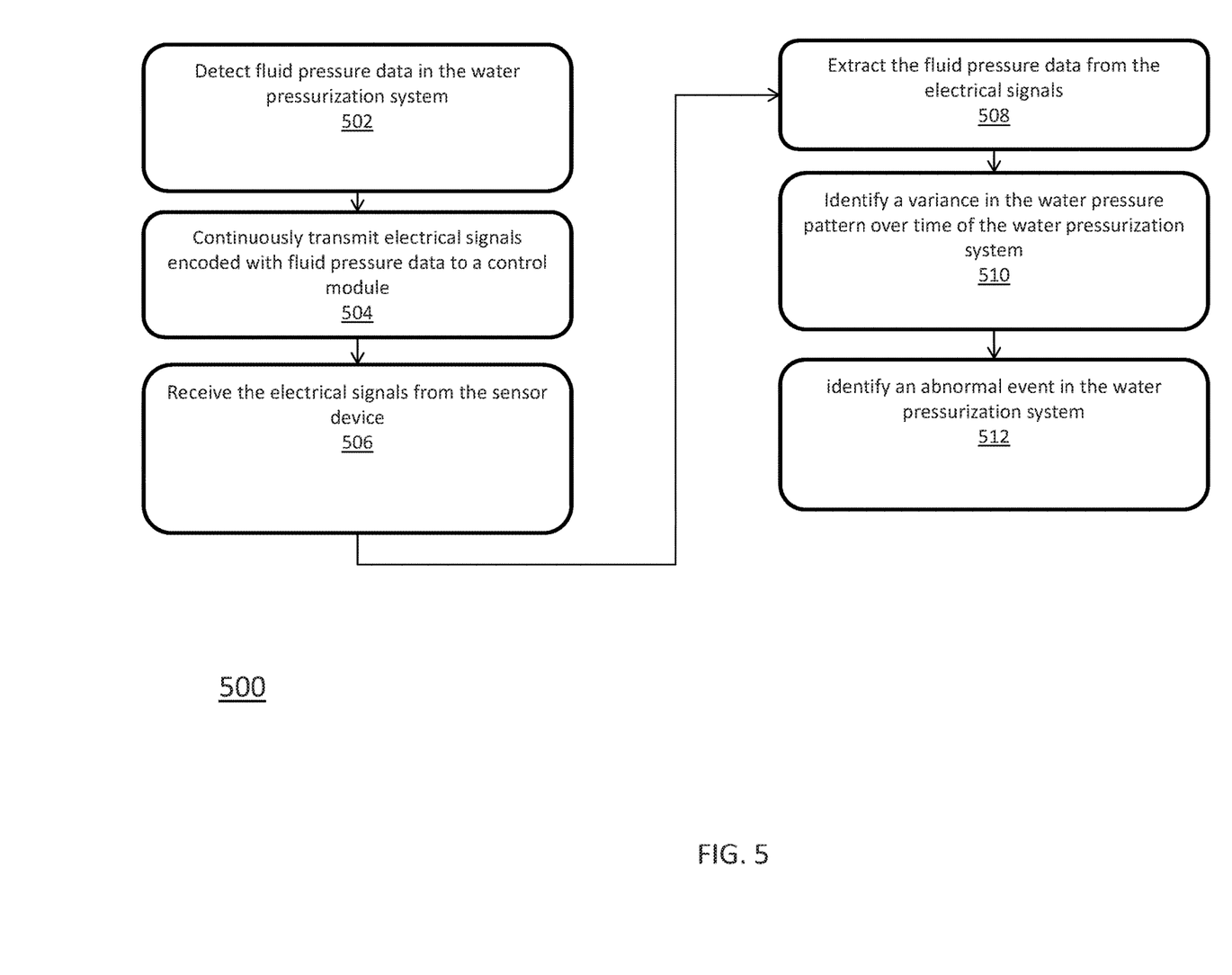
FIG. 5 illustrates a flowchart illustrating the process of automated water pressure monitoring in accordance with an embodiment.

FIG. 5 is a flowchart illustrating a process for automated water pressure monitoring, according to some embodiments. It is to be appreciated that the operations may occur in a different order, and some operations may not be performed. Merely as an example, the flow of data will be described with respect to FIGS. 1-4.

The method 500 starts at step 502. In operation 502, a sensor device mounted to a water pressurization system may detect fluid pressure data in the water pressurization system. The water pressurization system may include a water line and water source. The water pressurization system may provide water to a plumbing system such as inside a house or building. The sensor device may be a pressure sensor. The sensor device may encode the electrical signals into fluid pressure data. The fluid pressure data may include pressure measurements.

In operation 504, the sensor device may continuously transmit electrical signals encoded with fluid pressure data to a control module. The control module may be operatively coupled to the sensor device. In one example, the control module may be coupled to the sensor device using a cable or wire. In an embodiment, the sensor device may transmit the encoded electrical signals periodically instead of continuously.

In operation 506, the control module may receive the electrical current or signals from the sensor device. The control module is calibrated to identify a normal water pressure pattern of the water pressurization system. The normal water pressure pattern may include an expected water pressure over a period of time.

In operation 508, the control module may extract the fluid pressure data from the electrical signals.

In operation 510, the control module may identify a variance in the water pressure pattern over time based on a comparison of the received fluid pressure data and the normal water pressure pattern. The control module may store the fluid pattern data in the memory and identify the variance in the water pressurization system over time by determining a pattern of the water pressure based on the fluid pattern data stored in the memory.

In operation 512, the control module may identify an abnormal event in the water pressurization system based on a comparison of the variance in the water pressure pattern to a unique signature of the abnormal event. The unique signature is an abnormal water pressure pattern equivalent to the variance in the water pressure pattern. The abnormal event may indicate a failure in the water pressurization system. The control module may transmit an alert to a user device or a device operated by a water professional (water professional device). The control module may render the alert on a display. The control module may transmit the fluid pattern data to a data repository for storage.

Figure 6:
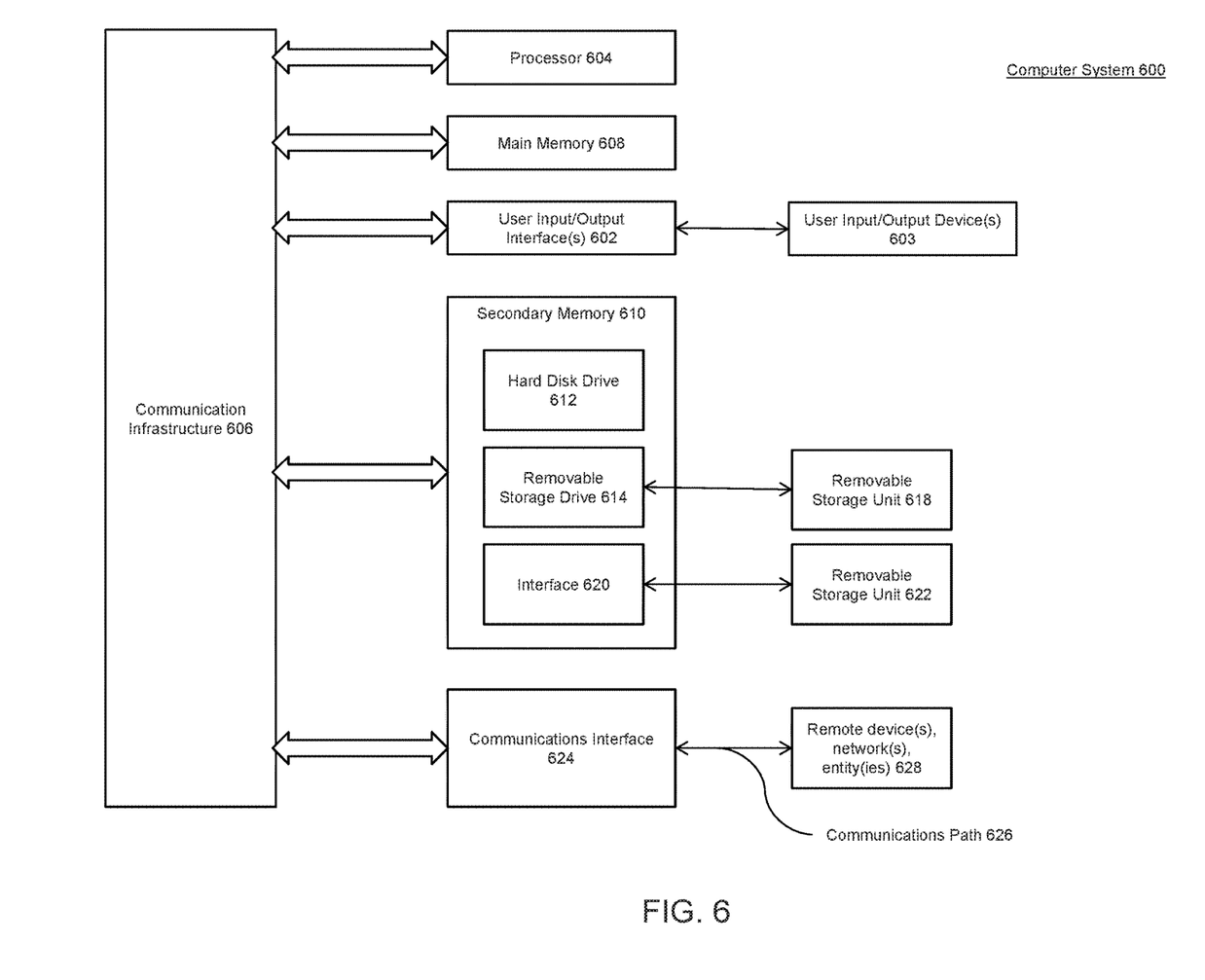
FIG. 6 is a block diagram of example components of computing device, according to an embodiment.

FIG. 6 is a block diagram of example components of device 600. One or more computer systems 600 may be used, for example, to implement any of the embodiments discussed herein, as well as combinations and sub-combinations thereof. Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614.

Removable storage drive 614 may interact with a removable storage unit 618. Removable storage unit 618 may include a computer usable or readable storage device having stored thereon computer software (control logic) and/or data. Removable storage unit 618 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for automated water pressure monitoring, the method comprising:
   detecting, by a sensor device mounted to a private water pressurization system having a well, a water line in fluid communication with the well and serving a building and a well pump and a pressure tank in fluid communication with the water line, fluid pressure data in the water pressurization system, wherein the water line of the water pressurization system is configured to transport water from a water source to the building;
   continuously transmitting, by the sensor device, electrical signals encoded with fluid pressure data to a control module mounted at the building, wherein the control module includes an audio generating device or a display and the control module is separate and distinct from the sensor device;
   receiving, by the control module operatively coupled to the sensor device, the electrical signals from the sensor device, wherein the control module is calibrated to identify a normal water pressure pattern of the water pressurization system;
   extracting, by the control module, the fluid pressure data from the electrical signals;
   identifying, by the control module, a variance in the water pressure pattern over time of the water pressurization system based on a comparison of the received fluid pressure data and the normal water pressure pattern;
   identifying, by the control module, an abnormal event in the water pressurization system based on a comparison of the variance in the water pressure pattern to a unique signature of the abnormal event, wherein the unique signature is an abnormal water pressure pattern equivalent to the variance in the water pressure pattern; and
   outputting at the building, by the control module, an alert indicating the abnormal event using the audio generating device or the display.

2. The method of claim 1, further comprising transmitting, by the control module, an alert to a user device or a device operated by a water professional.

3. The method of claim 1, wherein the sensor is a pressure sensor.

4. The method of claim 3, wherein the pressure sensor is one or more of: an electronic pulse pressure sensor, an analog electric signal pressure sensor, or a digital electric signal pressure sensor.

5. The method of claim 1, further comprising: storing, by the control module including a memory, the fluid pattern data in the memory; and identifying, by the control module, the variance in the water pressurization system over time by determining a pattern of the water pressure based on the fluid pattern data stored in the memory.

6. The method of claim 1, further comprising transmitting, by the control module, the fluid pattern data to a data repository for storage.

7. The method of claim 1, wherein the water pressurization system includes a water line and a water source.

8. The method of claim 1, wherein the abnormal events indicate a failure in the water pressurization system.

9. A system for automated water pressure monitoring, the system comprising:
   a sensor device mounted to a private water pressurization system having a well, a water line in fluid communication with the well and serving a building and a well pump and a pressure tank in fluid communication with the water line, the sensor device configured to detect fluid pressure data in the water pressurization system, wherein the water line of the water pressurization system is configured to transport water from a water source to the building;

a control module operatively coupled to the sensor device, and including a memory, a processor in communication with the memory, and an audio generating device or a display, wherein the control module is mounted at the building and the control module is separate and distinct from the sensor device, and wherein the processor configured to:

continuously receive electrical signals encoded with the fluid pressure data from the sensor device, wherein the control module is calibrated to identify a normal water pressure pattern of the water pressurization system;

extract the fluid pressure data from the electrical signals;

identify a variance in the water pressure pattern over time of the water pressurization system based on a comparison of the received fluid pressure data and the normal water pressure pattern;

identify an abnormal event in the water pressurization system based on a comparison of the variance in the water pressure pattern to a unique signature of the abnormal event, wherein the unique signature is an abnormal water pressure pattern equivalent to the variance in the water pressure pattern; and output an alert at the building by the control module indicating the abnormal event using the audio generating device or the display.

10. The system of claim 9, wherein the processor is further configured to transmit the alert to a user device or a device operated by a water professional.

11. The system of claim 9, wherein the sensor is a pressure sensor.

12. The system of claim 11, wherein the pressure sensor is one or more of: an electronic pulse pressure sensor, an analog electric signal pressure sensor, or a digital electric signal pressure sensor.

13. The system of claim 9, wherein the processor is configured to:

store the fluid pattern data in the memory; and identify the variance in the water pressurization system over time by determining a pattern of the water pressure based on the fluid pattern data stored in the memory.

14. The system of claim 9, wherein the processor is configured to transmit the fluid pattern data to a data repository for storage.

15. The system of claim 9, wherein the water pressurization system includes a water line and a water source.

16. The system of claim 9, wherein the abnormal events indicate a failure in the water pressurization system.

17. A non-transitory computer readable medium storing instructions that, when executed by one or more processors of a device, cause the one or more processors to:

continuously receive, at a control module mounted at a building, electrical signals encoded with fluid pressure data from a sensor device mounted to a private water pressurization system having a well, a water line in fluid communication with the well and serving a building and a well pump and a pressure tank in fluid communication with the water line, wherein the water line of the water pressurization system is configured to transport water from a water source to the building and the control module is separate and distinct from the sensor device;

extract the fluid pressure data from the electrical signals;

identify a variance in the water pressure pattern over time of the water pressurization system based on a comparison of the received fluid pressure data and normal water pressure pattern;

identify an abnormal event in the water pressurization system based on a comparison of the variance in the water pressure pattern to a unique signature of the abnormal event, wherein the unique signature is an abnormal water pressure pattern equivalent to the variance in the water pressure pattern; and outputting at the building an alert indicating the abnormal event using an audio generating device or a display of the control module.

18. The non-transitory medium of claim 17, further comprising instructions that, when executed by the one or more processors of the device, cause the one or more processors to:

transmit the alert indicating the abnormal condition to a user device or a device operated by a water professional.

19. The method of claim 1, wherein the water source is a well pump.

20. The method of claim 1, wherein the abnormal event is one of a plurality of abnormal events and each respective abnormal event of the plurality of abnormal events corresponds to a unique signature, and wherein the abnormal event is damage to one or more components of the water pressurization system damage or power waste.

* * * * *